United States Patent [19]
Kawakubo et al.

[11] Patent Number: 5,153,892
[45] Date of Patent: Oct. 6, 1992

[54] HIGH-PRESSURE GAS LASER APPARATUS AND METHOD OF LASER PROCESSING

[75] Inventors: Yukio Kawakubo; Yoshiyuki Kubota; Kouji Sasaki, all of Hitachi; Atsushi Miki, Katsuta; Satoshi Ogura, Hitachi, all of Japan

[73] Assignee: Hitachi, Ltd., Tokyo, Japan

[21] Appl. No.: 640,168

[22] Filed: Jan. 11, 1991

[30] Foreign Application Priority Data

Jan. 24, 1990 [JP] Japan .................................. 2-012588
May 24, 1990 [JP] Japan .................................. 2-134802

[51] Int. Cl.⁵ .............................................. H01S 3/097
[52] U.S. Cl. .................................... 372/87; 372/56; 372/57; 372/61; 372/86
[58] Field of Search ................. 372/87, 86, 57, 56, 372/61

[56] References Cited

U.S. PATENT DOCUMENTS

| | | | |
|---|---|---|---|
| 4,417,342 | 11/1983 | McKee | 372/87 |
| 4,509,176 | 4/1985 | Marchetti et al. | 372/87 |
| 4,555,787 | 11/1985 | Cohn et al. | 372/86 |
| 4,629,203 | 7/1987 | Taylor et al. | 372/86 |
| 4,748,635 | 5/1988 | McLellan | 372/87 |
| 4,953,174 | 8/1990 | Eldridge et al. | 372/87 |

FOREIGN PATENT DOCUMENTS 0199475 8/1988 Japan .
0201975 8/1989 Japan .

OTHER PUBLICATIONS

Beaupere et al, "TuH6 High Frequency Corona Photo-triggared Excimer Lasers", CLEO 1988.

Primary Examiner—Georgia Y. Epps
Attorney, Agent, or Firm—Antonelli, Terry, Stout & Kraus

[57] ABSTRACT

A novel gas laser apparatus is disclosed, which comprises a hermetic container with a gas laser medium sealed therein, a plurality of main discharge electrodes arranged in the hermetic container for causing the main discharge in the gas laser medium thereby to generate a laser beam, and a device for subjecting the discharge space between the main discharge electrodes to preionization over a wide range thereof before the main discharge by use of a reflected laser beam or an ultraviolet ray lamp.

50 Claims, 10 Drawing Sheets

HIGH-PRESSURE GAS LASER APPARATUS AND METHOD OF LASER PROCESSING

BACKGROUND OF THE INVENTION

The present invention relates to a high-pressure gas laser apparatus and a method of processing with laser, or more in particular to a high-pressure laser apparatus suitable for excimer laser of large aperture (beam size) and high output power and a method of processing using laser.

A method using a corona UV preionization described in CLEO' 88, p. 64 is well known as a conventional technique for enlarging the aperture of the discharge-pumped excimer laser. According to this method, after application of a voltage between main electrodes, a certain lead time is inserted before generating a corona discharge on one of the main electrodes, and the UV light contained in the discharge is used to cause preionization of the main discharge space thereby to start main discharge with trigger action.

In the above-mentioned prior art system, which utilizes the UV light caused with the corona discharge for preionization, it is easy to increase the aperture (diameter) of discharge along the width of the electrodes in the main discharge space in principle. Since the attainment of uniform discharge along the electrode gap is limited, however, it is impossible to generate a laser beam of large.

JP-A-63-199475 discloses a method of preliminary ionization of a gas laser apparatus which is so configured that an X ray from an X-ray tube is used as a source of preionization of a discharge-pumped excimer laser and the X ray is irradiated from the back side of cathode of porous opening structure among the main discharge electrodes.

On the other hand, a system using a laser beam as a source of preionization is disclosed in U.S. Pat. No. 4,679,203. This system is such that a laser beam for preionization is irradiated between main discharge electrodes to attain preionization while at the same time energizing a rail gap switch at a time point when the pulse voltage of a pulse forming line circuit (PFL) indicates a crest value.

SUMMARY OF THE INVENTION

The object of the present invention is to provide a high pressure gas laser apparatus for generating a laser beam of large area (diameter).

According to one aspect of the present invention, there is provided a high pressure gas laser apparatus comprising a container for reserving a laser medium gas, a plurality of main discharge electrodes arranged in the container for discharging the laser medium gas, and at least a ray-transmitting window formed in the container for leading out the laser beam generated by discharge.

According to another aspect of the invention, there is provided a high pressure gas laser apparatus comprising a power supply, a circuit connected to main discharge electrodes and electrode excitation means for accumulating charges from the power supply and releasing the accumulated charges to the discharge electrodes in response to a discharge command.

According to still another aspect of the present invention, there is provided a high pressure gas laser apparatus comprising preionization means for effecting the preionization of the discharge space prior to the main discharge.

In order to achieve the above-mentioned object, according to a high pressure gas laser apparatus of the present invention, the high- and low-voltage electrodes of the main discharge electrode means are arranged alternately with each other to form at least two layers of discharge means in parallel to the optical axis of the laser. The apparatus also uses a multiple-reflection laser beam having a time lag against the voltage application to the main discharge electrodes as a means for preionization of the discharge space before main discharge between the main discharge electrodes.

In view of the fact that the main discharge electrodes comprise high- and low-voltage electrodes arranged in at least two alternate layers of discharge means in parallel to the laser optical axis, a laser beam of large beam size (diameter) is capable of being produced to the extent that a uniform discharge of large aperture (diameter) is formed along the width of the electrodes at each layer of the discharge means. Also, since a preliminary laser source is provided by a laser beam, the beam section is capable of being shaped as desired. Further, the use of a reflector for multiple reflection permits uniform preionization of a large-volume discharge space. Thus a uniform ionization of large volume is obtained on the one hand, and a laser beam of large aperture (diameter) is produced on the other hand.

As explained above, according to the present invention, high- and low-voltage electrodes are arranged in alternate layers to produce a main discharge means of an equivalently large volume, thereby providing a high pressure gas laser apparatus of large diameter. Also, the use of a multiple-reflection laser beam as a preionization source makes possible uniform ionization of a discharge space of large volume, also contributing to provide a high pressure gas laser apparatus of large diameter.

The preionization source of the apparatus according to the present invention may use an X ray or the above-mentioned laser beam.

The laser beam has a great advantage as a preionization source due to the features that (1) multiple reflections by a reflector is possible, (2) the propagation attenuation in a medium gas is small, and (3) it is sufficient to take only a single wavelength into consideration in designing an optical system.

Depending on applications, however, a gas laser apparatus of superior quality will become possible to realize if an ultraviolet ray lamp is used as a preliminary ionization source.

Explanation will be made below about a case in which a ultraviolet ray lamp is used as a preliminary ionization source.

In the case where an X ray or a laser beam is used as a preliminary ionization source, it is difficult to emit the X ray or the laser beam continuously in view of the functions of the apparatus, and the ultraviolet emission of the preionization source has a high-peak pulsed intensity. In spite of time duration required before producing a preionization necessary and sufficient for glow discharge, therefore, it is impossible to emit an X ray or a laser beam during such a time length. In such a case, if a pulsed laser beam or X ray is applied at the same time that a voltage is applied between the main discharge electrodes, the main charge is liable to start at a comparatively low terminal voltage between the main discharge electrodes. If a pulsed laser beam or an X ray is applied between the main discharge electrodes at a comparatively high terminal voltage between the main discharge electrodes, on the other hand, the main discharge is undesirably triggered before the preionization reaches a sufficient magnitude. As a result, the X ray or the laser beam fails to produce a uniform glow discharge, and the generation of an arc deteriorates the laser medium gas, thereby often reducing the laser output or output efficiency.

As disclosed in JP-A-1-201975, an apparatus has been suggested in which an ultraviolet ray lamp is used as a preionization source and arranged within a laser container. This configuration with a lamp housed in a container is liable to deteriorate the laser medium gas due to the heat generated by emission from the lamp.

The purpose for which the ultraviolet ray is used in an apparatus according to the present invention is to provide a gas laser apparatus and a laser processing system capable of generating a laser beam by uniform glow discharge without generating any arc.

Eight types of gas laser apparatus using an ultraviolet ray lamp will be described below.

In order to achieve the object of the present invention, a first gas laser apparatus comprises a container including a light-transmitting window for reserving a laser medium gas, a pair of main discharge electrodes arranged in opposed relationship to each other within the container for leading the laser beam caused by discharge to the light-transmitting window, electrode excitation means for forming a circuit connecting a power supply and each of the main discharge electrodes, accumulating the charges from the power supply and releasing the accumulated charges to each of the main discharge electrodes in response to a discharge command, and preionization means including an ultraviolet ray lamp for applying the light from the ultraviolet ray lamp continuously into a laser medium gas between the main discharge electrodes when the terminal voltage between the main discharge electrodes reaches a set voltage level.

A second gas laser apparatus using an ultraviolet ray lamp according to the present invention comprises a container including at least a light-transmitting window for reserving a laser medium gas, a pair of main discharge electrodes arranged in opposed relationship to each other in the container for leading the laser beam caused by discharge to the light-transmitting window, electrode exciting means for forming a circuit connecting a power supply and each of the main discharge electrodes, accumulating the charges from the power supply and releasing the accumulated charges to each of the main discharge electrodes in response to a discharge command, first preionization means including an ultraviolet ray lamp for applying the light from the ultraviolet ray lamp continuously into a laser medium gas between the main discharge electrodes when the terminal voltage between the main discharge electrodes reaches a set voltage level, and second preionization means for applying the ultraviolet ray lamp light continuously into the laser medium gas between the main discharge electrodes.

A third gas laser apparatus using an ultraviolet ray lamp according to the present invention comprises a container including at least a light-transmitting window for reserving a laser medium gas, a pair of main discharge electrodes arranged in opposed relationship to each other in the container for leading the laser beam caused by discharge to the light-transmitting window, electrode excitation means for forming a circuit connecting a power supply and each of the main discharge electrodes, accumulating the charges from the power supply and releasing the accumulated charges to each of the main discharge electrodes in response to a discharge command, and preionization means including an ultraviolet ray lamp for applying the light from the ultraviolet ray lamp continuously into a laser medium gas between the main discharge electrodes while at the same time increasing the energy of the applied light progressively.

A fourth gas laser apparatus including the first, second or third apparatus described above comprises preionization means arranged outside of a container, a pair of main discharge electrodes, a plurality of light transmission paths formed over substantially the whole area of one of the main electrodes for leading the light from the light-transmitting window of the container to the other main electrode, and means for applying the lamp light from the preionization means into each of the light transmission paths.

A fifth gas laser apparatus including the first, second or third apparatus described above comprises a multi-layered main discharge electrode means including at least two sets of high- and low-voltage main discharge electrodes arranged in layers in opposed relationship to each other with a laser medium gas therebetween, electrode excitation means connected with the electrodes of each set of the multi-layered main discharge electrode means, and preionization means from which lamp light is applied into a laser medium gas between the electrodes of each set of the multi-layered main discharge electrode means. A sixth gas laser apparatus including the first, second, third, fourth or fifth apparatus described above comprises condensation means for condensing part of the lamp light from the preionization means to a specified area between the main discharge electrodes.

A seventh laser gas apparatus including the fourth apparatus comprises a container including at least light transmitting-window for emitting a laser beam and another light transmitting-window for introducing the light from an ultraviolet ray lamp.

An eighth gas laser apparatus including the fourth apparatus comprises a container including a light-transmitting window serving both the outgoing laser beam and incoming ultraviolet lamp ray and a beam splitter arranged in a laser beam propagation path and an ultraviolet lamp light propagation path outside the container.

According to the present invention, there is configured a laser processing system using a gas laser apparatus comprising any one of the first to eighth apparatuses for cutting a workpiece with the laser beam produced from main discharge electrodes.

According to an advantage of the present invention, the light from an ultraviolet ray lamp continues to be irradiated from preionization means onto a laser medium gas between main discharge electrodes in the course of voltage application to the main discharge electrodes by electrode excitation means, so that no slight error in the timing of irradiation of the lamp light prevents the continuous application of a predetermined amount of light of the ultraviolet ray lamp from starting main discharge upon attainment of a sufficient magnitude of preionization. As a result, a laser beam is capable of being generated under a uniform glow discharge without causing any arc between the electrodes. Further, a uniform preionization is effected between the main discharge electrodes, and a high-efficiency long-life output is produced by the operation of the main discharge trigger.

Continuous application of an ultraviolet lamp light to a laser medium gas of hydrogen chloride group is capable of dissociating a very small amount of impurities of hydrogen chloride group alone from the laser medium gas. Also, a sufficient preliminary ionization is secured by increasing the amount of preionization progressively, thereby stabilizing a breakdown voltage.

If the main discharge electrodes are made up of multiple-layered discharge electrode means, a uniform discharge is formed along the width of the electrodes, thereby making it possible to produce a large-aperture laser beam.

Further, to the extent that the preionization means is arranged outside the container to apply an ultraviolet lamp light between the main discharge electrodes from outside the container, the heat caused by the emission of the lamp light is prevented from deteriorating the laser medium gas while at the same time facilitating the maintenance of the preionization means. Furthermore, the lamp surface is prevented from being deteriorated or the transmittance from being reduced.

As described above, by preionization with continuous application of the ultraviolet lamp light into a laser gas, uniform glow discharge is made possible thereby to improve the efficiency and output of a laser beam.

Another advantage of the present invention residues in the fact that since the ultraviolet lamp light is applied into a container from outside thereof, the laser gas is not deteriorated by the ultraviolet lamp light, thereby contributing to a longer service life of the apparatus.

In addition, if the electrodes are constructed in multiple layers, it is possible to produce a large-aperture laser beam.

Furthermore, the use of preionization leads to the advantage of the present invention mentioned below.

Unlike in the prior art which requires a sophisticated technique for designing electrodes for the purposes of relaxing the electric field and optimizing the discharge and also for processing the electrodes by precision machining such as NC or the like, it becomes possible to attain a simple form of electrodes, thereby saving both economic inefficiency and labor.

DESCRIPTION OF THE PREFERRED EMBODIMENTS

A high pressure gas laser apparatus according to the present invention will be explained below with reference to the embodiments shown in the accompanying drawings.

Figure 1:
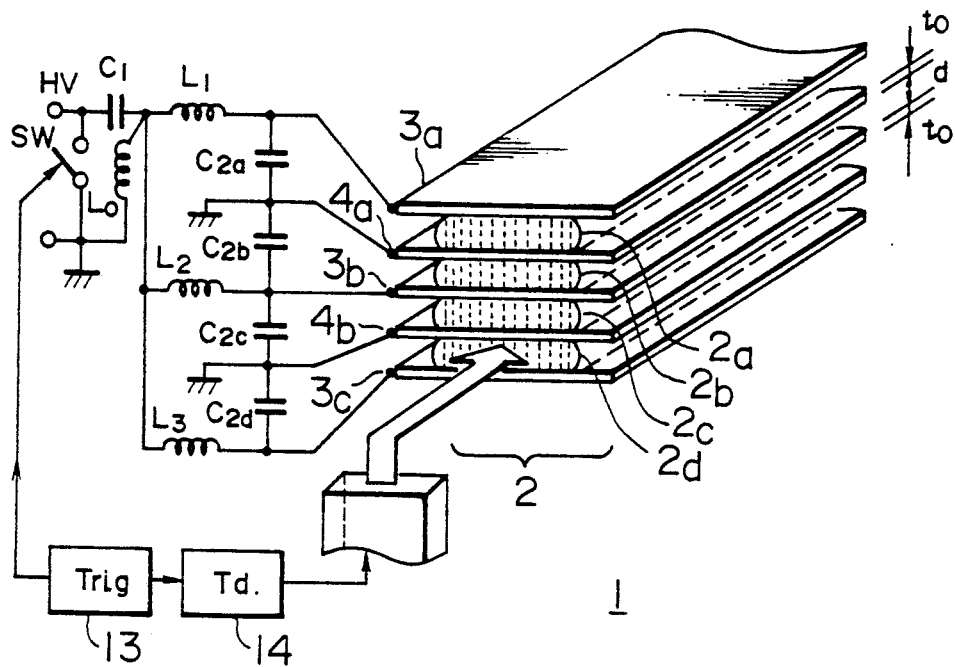
FIG. 1 is a perspective view showing electrodes of a high pressure gas laser apparatus according to an embodiment of the present invention.
Figure 2:
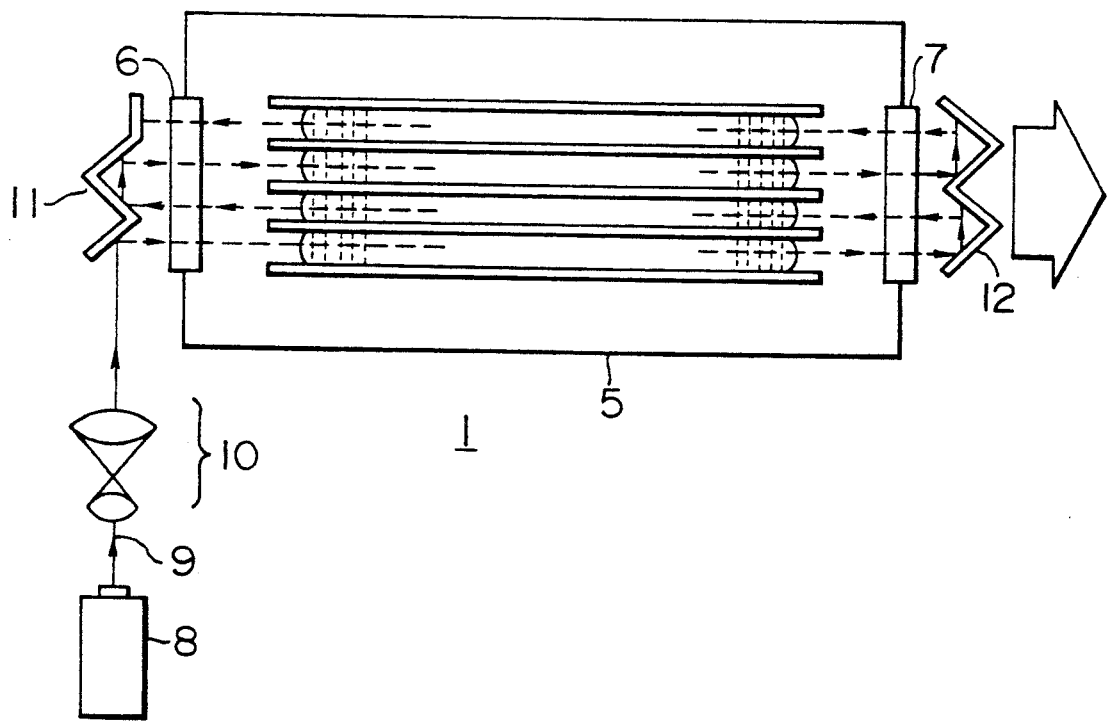
FIG. 2 is a longitudinal sectional view of the apparatus shown in FIG. 1.

FIGS. 1 and 2 show an embodiment of the present invention. In FIGS. 1 and 2, a main laser apparatus is a XeCl excimer laser comprising a main discharge means 2 having minor discharge means $2a$, $2b$, $2c$, $2d$ formed in layers of high-voltage main electrodes $3a$, $3b$, $3c$ and low-voltage main electrodes $4a$, $4b$ arranged in parallel to the laser optical axis. A gap d of the discharge means is set to a value sufficiently large as compared with the thickness $t_0$ of the main electrodes $4a$, $4b$, $3a$ to $3c$. The value $t_0$ selected at about 0.5 to 2 mm as against the value d of 10 to 20 mm, for example. Although nickel is usually used as a material of the electrodes, nickel-plated or gold plated aluminum may be used as an alternative material. Peaking capacitors $C_{2a}$, $C_{2b}$, $C_{2c}$, $C_{2d}$ are connected to corresponding main discharge electrode pairs $3a-4a$, $3b-4b$, $3c-4c$ respectively. The high-voltage main electrodes $3a$, $3b$, $3c$ are connected to a charging capacitor $C_1$ and a charging inductance L through inductances $L_1$, $L_2$, $L_3$ respectively. Further, the charging capacitor $C_1$ is connected to a high-voltage switch SW and a high-voltage charging power supply not shown. The main discharge means 2 is arranged in the gas container 5, with a rear-mirror (full-reflector) 6 and an output coupler (mirror) 7 making up a part of the gas container 5. A small laser means 5 such as a KrF excimer laser or the like UV laser is disposed as a preionization source outside of the main laser apparatus 1. The laser beam 9 emitted from this apparatus is adapted to pass each layered main discharge means by reflection mirrors 11, 12 through a beam-shaping optical system 10 made up of a cylindrical lens or the like.

The reflection mirror 12 is coated in such a manner as to eliminate reflection of a laser having a wavelength of the main laser apparatus, and the rear-mirror 6 and the output coupler 7 in such a manner as to eliminate reflection against a wavelength of the laser beam 9 for preionization.

A method using a dielectric multi-layered film is known for coating to adjust the reflectance factor against a certain wavelength as mentioned above. According to this method, materials of high and low refractive indexes deposited by evaporation and having a film thickness of λ/4 (λ: Wavelength of light) are formed in alternate layers. Combinations of materials deposited by evaporation include $PbF_2/Na_3AlF_3$, $HfO_2/SiO_2$, $Al_2O_3/NaF$, $ScO_3/MgF_2$, $ThF_4/Na_3AlF_6$ or $ZrO_2/SiO_2$.

Delay means 14 is inserted between the main laser means 1 and the trigger means 13 of the preionization means 9 for providing a time lag between the command signals of the two means.

Figure 3:
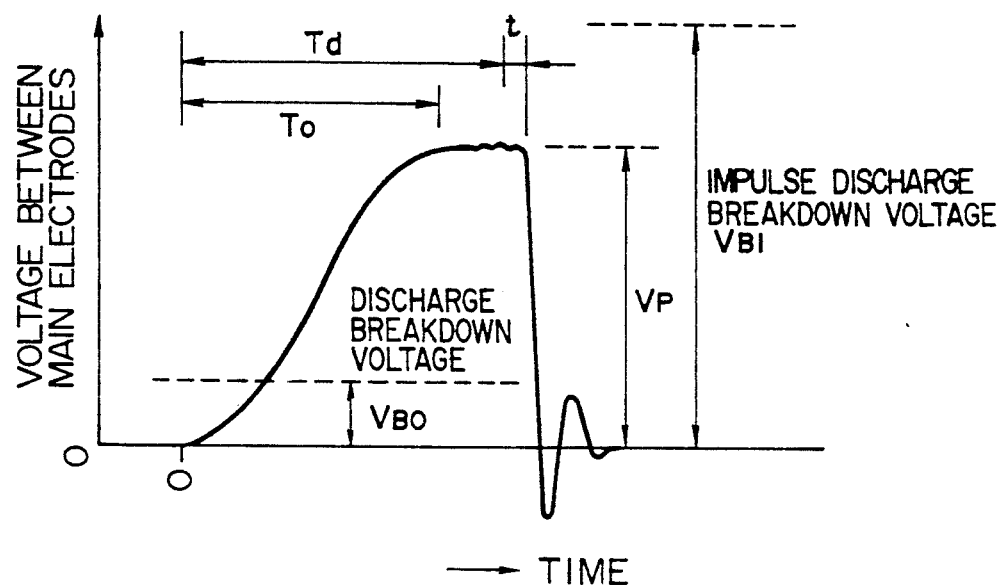
FIG. 3 is a diagram showing a characteristic representing the relationship between the voltage across the main discharge electrodes and time according to an embodiment of the present invention.

First, the charging capacitor $C_1$ is charged with a predetermined high voltage Vs through an inductance $L_0$ by an external high-voltage charging power supply. Upon closing of a high-voltage switch SW in response to a command signal from the trigger means 13, the charges are moved to the peaking capacitors $C_{2a}$, $C_{2b}$, $C_{2c}$, $C_{2d}$ through resonance circuits of loops formed of $C_1$, SW, $C_{2a}$ and $L_1$ in that order, $C_1$, SW, $C_{2b}$ and $L_2$ in that order, $C_1$, SW, $C_{2c}$ and $L_2$ in that order and $C_1$, SW, $C_{2d}$ and $L_3$ in that order respectively. The values of the inductances $L_1$, $L_2$, $L_3$ are regulated in such a manner that the pulse charging time $T_0$ to the peaking capacitors $C_{2a}$, $C_{2b}$, $C_{2c}$, $C_{2d}$ is sufficiently long, say, 5 μs to 50 μs, as compared with the main charging time. As shown in FIG. 3, for example, the laser beam of the preionization laser means 8 is set by the delay means 14 to be emitted a time Td (Td≃To) behind the pulse charging start time of the peaking capacitors.

In the time region satisfying the relationship t < Td, there occurs no preionization in the main discharge spaces, and therefore, as ascertained experimentally, the discharge breakdown voltage $V_{BI}$ of an impulse (about 5 μs to 50 μs) between the main electrodes of each layer is sufficiently high as compared with a corresponding DC discharge breakdown voltage $V_{bO}$ ($V_{B1} \simeq 10 \times V_{B0}$).

Figure 4:
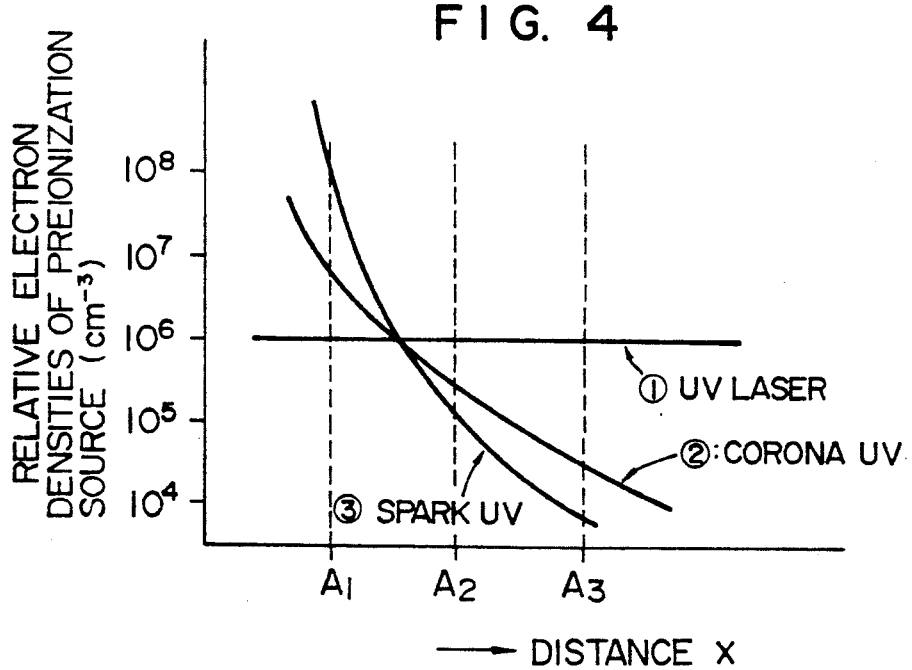
FIG. 4 is a diagram showing a characteristic representing the relationship between distance and electron density of a preliminary ionization source.

The pulse charge voltage of the peaking capacitors is set to satisfy the relationship $$V_{B0} < V_p < V_{B1} \qquad (1)$$

so that the preionization laser beam 9 is applied with a time lag of Td and is reflected successively on the reflection mirrors 11, 12. The multi-layered main discharge spaces are thus successively subjected to preionization. Assume that the resonator of the main laser apparatus 1 has a length of 1 m and that the pulse of the laser beam for preionization covers two roundtrips along the optical axis of the main laser apparatus. Then the distance covered is 4 m. An experiment shows that the attenuation rate of the laser beam during propagation in the gas is not more than several %/m, and the laser beam is not substantially attenuated while covering this distance, thus maintaining the effect of the preionization. This compares with other preionization sources as shown in FIG. 4 for the readers' reference. Characters $A_1$, $A_2$ designate normal positions of the main electrodes, and $A_1$, $A_3$ the positions of the main electrodes with the gap therebetween magnified twice as large. The preionization source is assumed to be located rearward of the main electrode $A_1$, and the preionization electron density $n_e$ is standardized on the assumption that the values $A_1$ and $A_2$ at intermediate positions are all equal ($n_3 \simeq 10^6$ cm$^{-3}$). The corona UV or speak UV basically has a spot light source or a light source arranged in parallel. With the increase in the distance from the light source, therefore, it is seen that the density of electrons due to preionization extremely decreases, thereby making it difficult to attain uniform discharge along the direction of penetration. The discharge between the main electrodes starts with a time lag of about τ = 50 ns after arrival of the preionization laser beam. Since electrons of ne = $10^6$ cm$^{-3}$ exist as seed electrons due to the preionization, however, a uniform discharge is realized over the whole main discharge space.

According to this embodiment, a laser beam small in propagation attenuation is used as a preionization source by multiple reflections, and therefore it is possible to subject the spaces of a large volume to uniform preionization, thereby providing a high air pressure gas laser apparatus with a large-aperture laser beam. Also, in this embodiment, a main electrode space is formed as a combination of multi-layered small-gap discharge spaces and the applied voltage Vs for single small main discharge is realized with a comparative low voltage matching the gap. The insulation of the laser apparatus is thus facilitated, while at the same time reducing the charging power supply.

Figure 5:
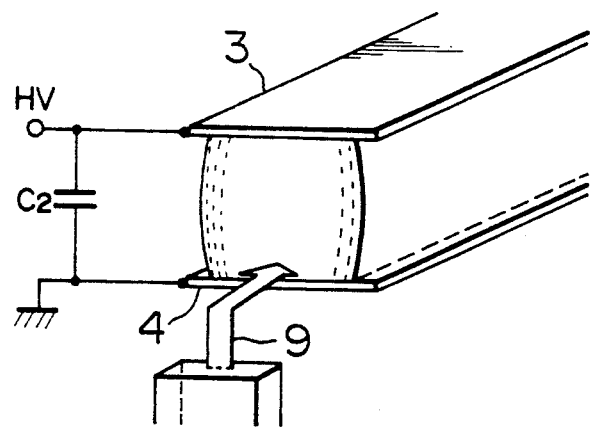
FIG. 5 is a perspective view showing the electrode according to a second embodiment of the present invention.
Figure 6:
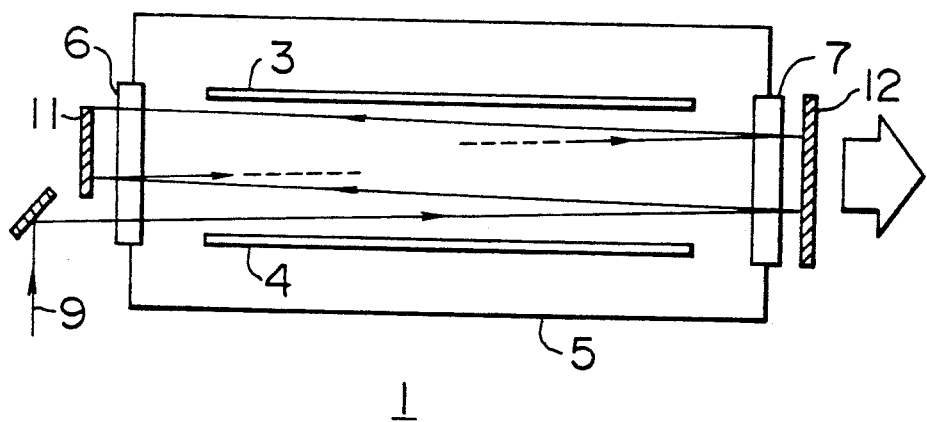
FIG. 6 is a longitudinal sectional view of the component parts shown in FIG. 5.

FIGS. 5 and 6 show a second embodiment of the present invention. In this embodiment, the main discharge electrodes are formed of a pair of electrodes 3, 4. A preionization laser beam 9 is reflected a multiplicity of times on reflection mirror 11, 12, whereby the main discharge space is subjected to preionization in uniform fashion.

The advantage of the present embodiment lies in that a large-diameter high-pressure gas laser apparatus is configured in a simple fashion.

Figure 7:
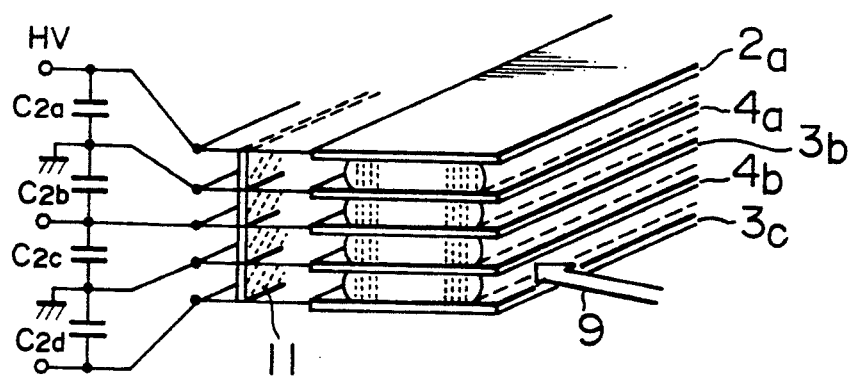
FIG. 7 is a perspective view of the electrodes according to a third embodiment of the present invention.
Figure 8:
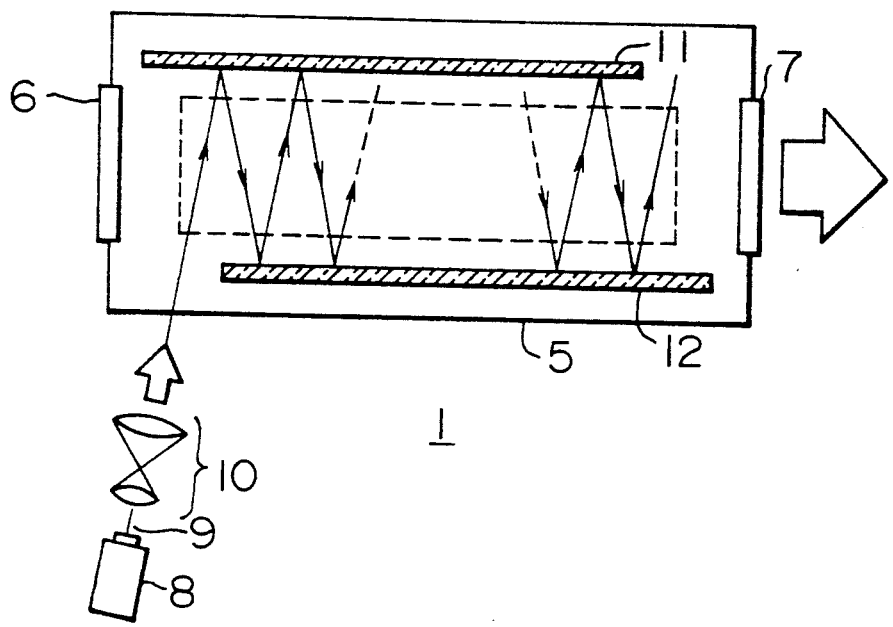
FIG. 8 is a longitudinal sectional view of the component parts shown in FIG. 7.

A third embodiment of the present invention is shown in FIGS. 7 and 8. According to this embodiment, reflection mirrors 11, 12 are arranged on the sides of the main laser apparatus 1 in such a manner that a preionization laser beam 9 may cross the optical axis of the main laser apparatus 1. This embodiment permits large-volume discharge spaces to be subjected to uniform preionization, thus providing a high Pressure gas large apparatus with a large-aperture laser beam. Also, the fact that the optical axis of the main laser apparatus 1 crosses that of the preionization laser beam 9 leads to the advantage that the reflection films of the reflection mirrors 11, 12, the full reflector 6 and the output mirror may be taken into account only for a single wavelength.

Figure 9:
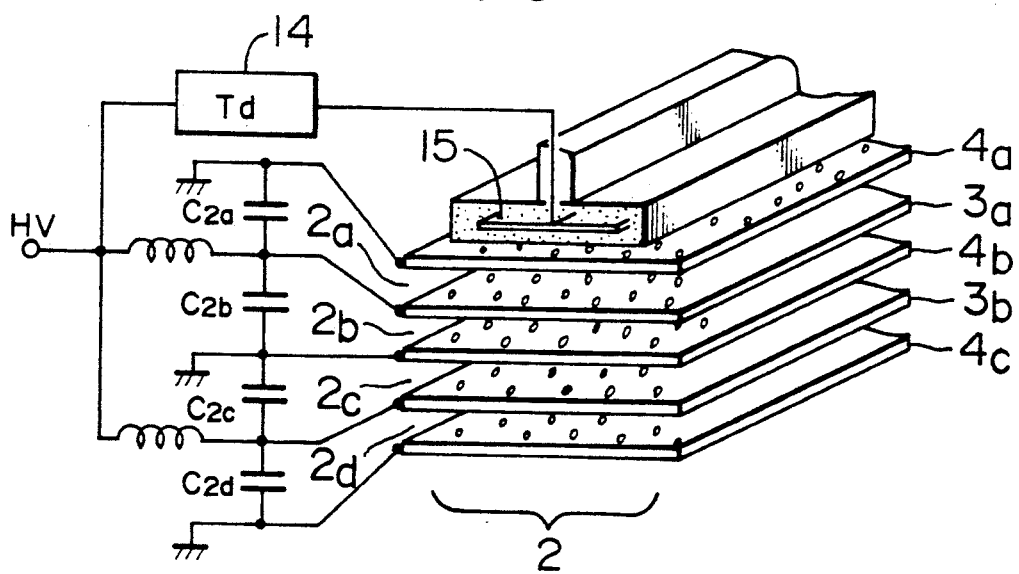
FIG. 9 is a perspective of the electrodes according to a fourth embodiment of the present invention.

A fourth embodiment of the present invention is shown in FIG. 9. This embodiment comprises main discharge electrodes 4a, 3a, 4b, 3b, 4c each formed of a porous opening electrode having a multiplicity of pores. The uppermost main electrode has on the back side thereof a corona electrode 15 surrounded by a dielectric material such as ceramics which is connected to a high voltage means through the delay means 14. After application of a pulse voltage to the high-voltage main discharge electrodes 3a, 3b, a high voltage pulse is impressed on the corona electrode 15, and the preionization and trigger action thereof starts, first of all, the main discharge of only the main discharge space 2a of the uppermost layer thereby to start the laser oscillation. Since each main electrode has a multiplicity of pores, the leakage of UV light through the openings thereof provides a preionization source and a trigger source for the main discharge space 2b in the next stage thereby to start the main discharge in the next stage. In this way, the main discharge of layers is successively caused, thereby generating a large-aperture laser beam as a whole.

According to this embodiment, the discharge along the width of the electrodes is easily increased in scale. Also, introduction of multi-layered discharges makes it possible to increase the diameter of discharge along the electrode gaps, thereby providing a large-diameter high pressure gas laser apparatus.

Figure 10:
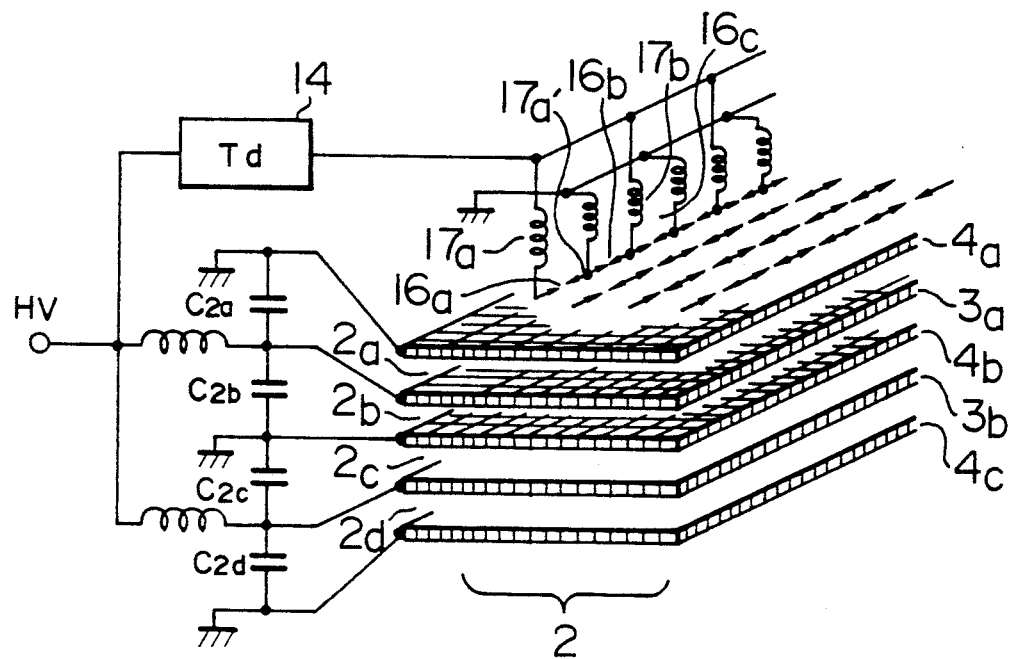
FIG. 10 is a perspective view of the electrodes according to a fifth embodiment of the present invention.

FIG. 10 is a diagram showing a fifth embodiment of the present invention. The embodiment shown in FIG. 10 is such that each of the main discharge electrodes 4a, 3a, 4b, 3b, 4c is formed in mesh. The uppermost main electrode 4a has on the back thereof very small gaps 16a, 16b, ... An end of each gap electrode is connected to a high voltage means through ballast inductances 17a, 17b, and delay means 14 respectively. The other end of each gap electrode is connected to the grounding potential through inductances 17a', 17b' and so on. After application of a pulse voltage to the high-voltage main discharge electrodes 3a, 3b, a high pulse voltage is impressed on the gap electrodes, so that the preionization and trigger action of the spark UV light starts, first of all, the main discharge of only the main discharge space 2a of the uppermost layer thereby to start laser oscillation. Each main electrode is in mesh form, and therefore the leakage light through the apertures thereof provides a source of preioniztation and trigger for the main discharge space 2b in the next stage, thus starting the main discharge in the next stage. In this way, main discharges are caused successively in tiered form for generating a large-diameter laser beam as a whole. According to this embodiment, gap electrodes for preionization are arranged in a multiplicity of numbers not only along the axial direction but also in parallel to the width in order to assure uniform discharge along the width of the electrodes.

The present embodiment has the advantage of providing a high pressure gas laser apparatus of large diameter.

Figure 11:
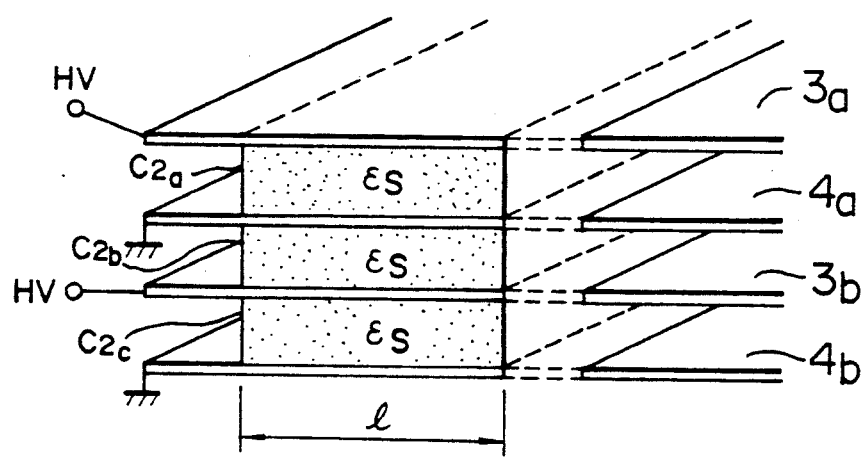
FIG. 11 is a perspective view of the electrodes according to a sixth embodiment of the present invention.

A sixth embodiment of the present invention is shown in FIG. 11. The embodiment shown in FIG. 11 is configured of a ceramics capacitor combination including peaking capacitors $C_{2a}$, $C_{2b}$, $C_{2c}$ integrated with each other. If the main component of the ceramics is assumed to be $SrTiO_3$, for instance, this structure having a dielectric constant of about $\epsilon_s = 1500$ is capable of being easily fabricated. Suppose that the distance covered by propagation of the pulse voltage is l, and if the ceramics is considered as a pulse-shaping circuit element, then the pulse width Tp is given as $$Tp = \frac{2l\sqrt{\epsilon_s}}{C} \quad (2)$$

where C is the velocity of light. Water ($\epsilon_s = 80$) has conventionally been used as a capacitor of a large-capacity pulse-shaping circuit. The advantage of the present embodiment resides in that the use of an integrally-formed ceramics capacitor as described above permits the shaping of a long pulse duration in small size.

Figure 12:
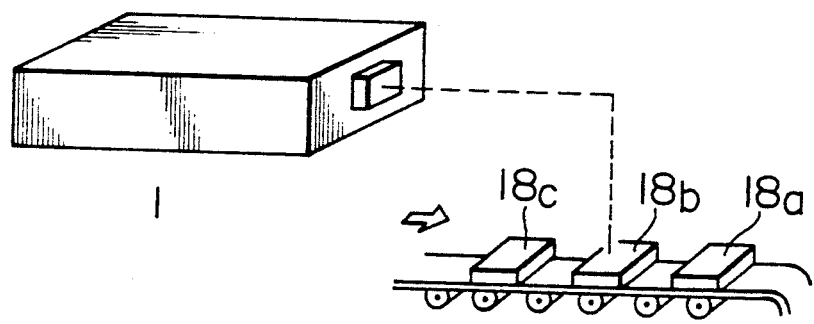
FIG. 12 is a perspective view of an application of the present invention.

FIG. 12 is a diagram showing an application of the present invention. By use of the large-diameter high air pressure gas laser apparatus described with reference to each embodiment above, an excimer laser of, say, XeCl is applied to a large-area polycrystal Si 18a, 18b, 18c, ... to improve the crystalline quality thereof by annealing. This process using a large-diameter laser beam makes it possible to anneal a specimen with a single irradiation, thereby leading to the advantage of eliminating an annealing failure which otherwise might be caused at superposed areas of beams in the conventional systems. This process using the present invention is especially effective in achieving large-area TFT display.

Apart from Si which has been described above as an example of application, the present invention is applicable with equal effect to the improvement of materials and the annealing processes in general.

Further, the persistence of the high-pressure laser beam for each pulse for the XeCl excimer laser is as short as approximately 30 ns in general applications. Even if a plurality of object materials 18a, 18b, 18c, ... are moved continuously, therefore, a high-accuracy continuous processing is made possible without any halt, thereby providing a high-speed processing system.

Figure 13:
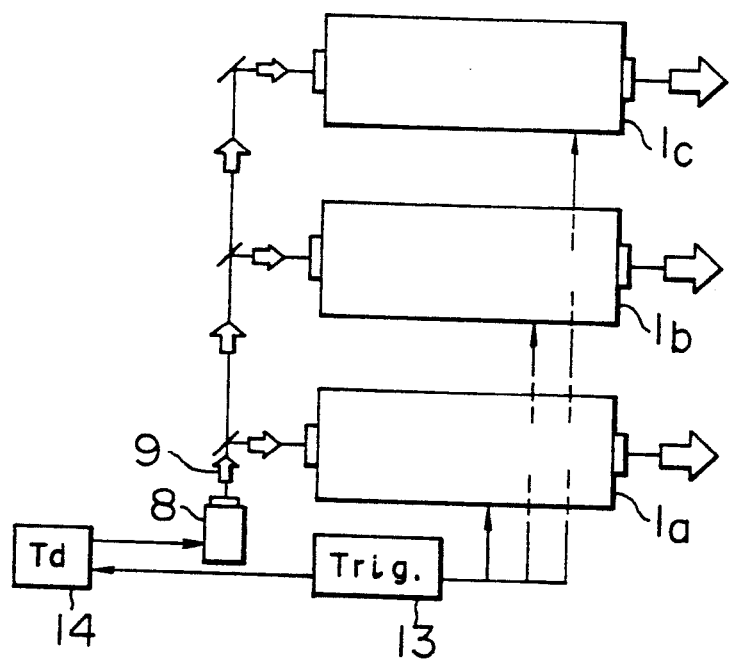
FIG. 13 is a diagram showing a system configuration of another application of the present invention.

FIG. 13 shows another application of the present invention, as shown in FIG. 13, assuming that a plurality of laser apparatus 1a, 1b, 1c are operated in parallel to each other as a system, a laser 8 installed externally is used as a source of preionization and trigger. According to this application, a plurality of large-aperture, high-power laser systems are capable of being operated in parallel.

Still another advantage of each of the embodiments described above is that if a sealed gas pressure is set to an atmospheric pressure or thereabouts, the differential pressure between internal and external pressures of the system with the rear (full-reflection) mirror 6 or the output coupler 7 as a boundary is possible to eliminate, thereby relaxing the mechanical stress of the rear mirror 6 or the output coupler 7.

Also, according to each of the above-described embodiments, if the thickness $t_0$ of the multi-layered main electrodes is reduced to less than one tenth the main discharge gap d (for single layer), the boundary of the laser beam at each layer due to main discharge is blurred, thereby realizing a laser beam equivalently large in diameter.

Still another advantage of each embodiment of the present invention described above is that the service life of the laser apparatus is lengthened by using a solid-state device as a high-voltage switch element coupled with the characteristic of very slow rise time of the pulse voltage applied to the main electrodes.

Embodiments of the present invention using the ultraviolet ray for preionization will be explained below.

First, a seventh embodiment of the invention will be described with reference to an accompanying drawing.

Figure 14:
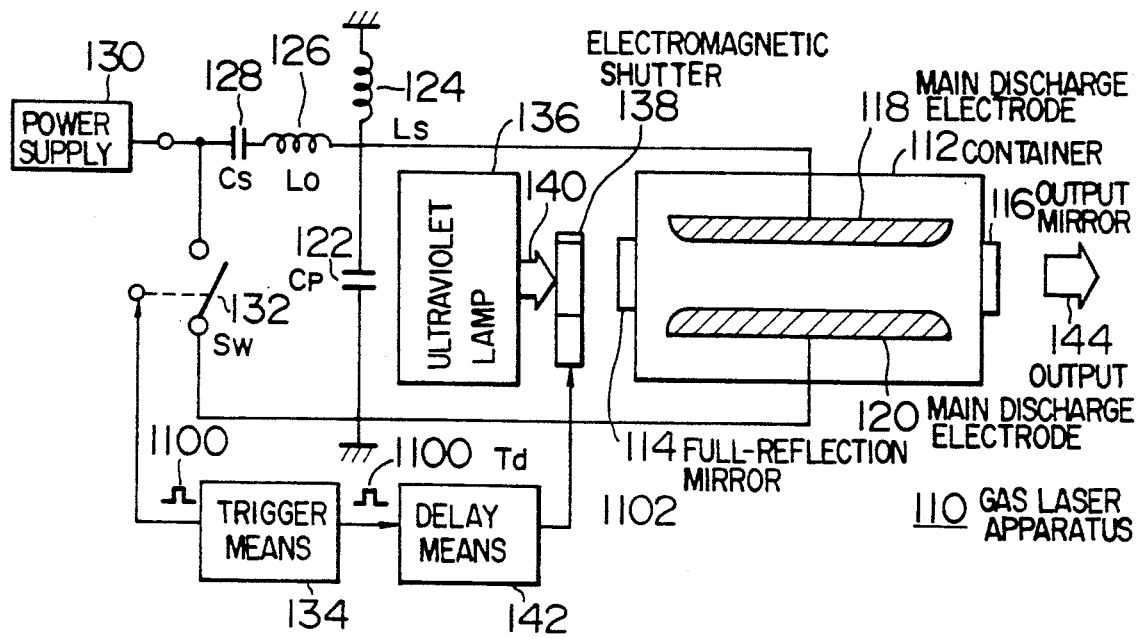
FIG. 14 is a diagram showing a seventh embodiment of the present invention.

In FIG. 14, a gas laser apparatus 110 comprises a box-shaped container 112 as an apparatus body. The container 112 has on the side wall thereof a full-reflection mirror 114 as a light-transmitting window and an output coupler (mirror) 116 in opposed relationship to each other. The container 112 filled with a mixed laser gas containing a halogen-group gas and rare gases, such as HCl, Xe and Ne for a XeCl excimer laser. This mixed laser gas contains therein main discharge electrodes 118, 120 in opposed relationship in such positions as to lead the laser beam toward the output coupler (mirror) 116.

The main discharge electrodes 118, 120 are connected across the peaking capacitor 122 in such a manner that the main discharge electrode 118 is connected to a charging inductance 124 as a high-voltage electrode on the one hand and to a high-voltage charging power supply 130 through an inductance 126 and a charging capacitor 128 on the other hand. A high-voltage switch 132 is interposed between the input side of the capacitor 128 and the earth. In response to a command signal from the trigger means 134, this switch 132 is operated to open or close the contacts thereof. Specifically, these contacts are adapted to close upon production of a pulse signal 1100 as an output discharge command from the trigger means 134. When the contacts of the switch 132 are closed, the charges accumulated in the capacitor 128 are released to the main discharge electrodes 118, 120. More specifically, the inductance 124, the peaking capacitor 122, the inductance 126, the capacitor 128 and the high-voltage switch 132 make up discharge-pumping means.

Figure 15:
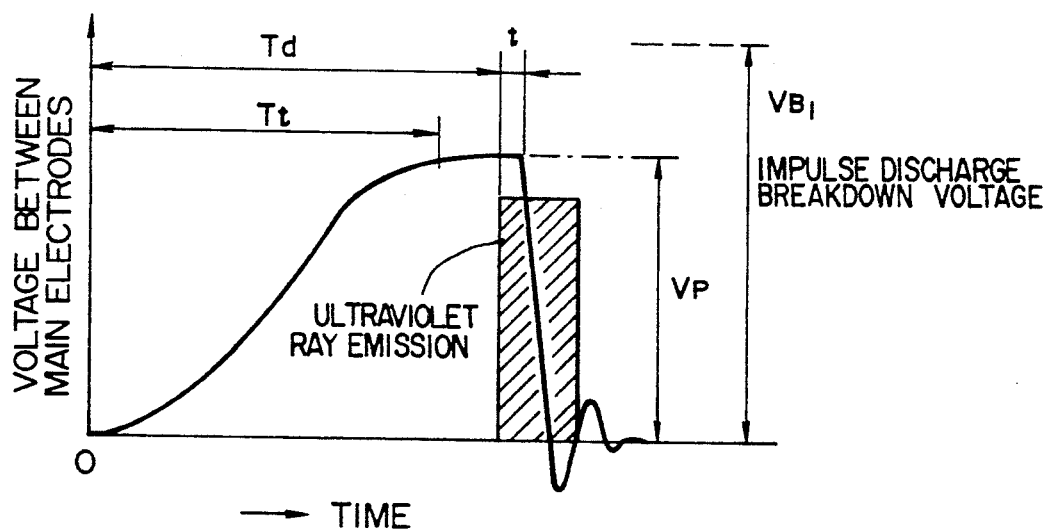
FIG. 15 is a diagram for explaining the operation of the apparatus shown in FIG. 14.

The container 112 has installed outside thereof a small ultraviolet lamp 136 as a preionization source. This ultraviolet lamp 136, which is arranged in opposition to the full-reflection mirror 136 through an electromagnetic shutter 138, is normally kept on so that the lamp light 140 from the ultraviolet lamp 136 is adapted to be irradiated on the full-reflection mirror 114 through an electromagnetic shutter 138 and an optical system including a cylindrical lens or the like. The full-reflection mirror 114 and the output coupler (mirror) 116 are coated with such a material as to cancel reflection against the wavelength of the lamp light 140 from the ultraviolet ray lamp 136. Consequently, the lamp light 140 entering the full-reflection mirror 114 is applied to the mixed laser gas between the main discharge electrodes 118, 120. The electromagnetic shutter 138 is connected to the trigger means 134 through the delay means 142 so that when a pulse signal 1100 from the trigger means 134 is produced by the delay means 142 as a pulse signal 1102 after a predetermined time lag, the electromagnetic shutter 138 remains open while the pulse signal 1102 is being produced. As long as the electromagnetic shutter 138 is open, the lamp light 140 with the ultraviolet ray held at a predetermined quality is irradiated continuously into the container 112. The delay time Td of the delay means 142, as shown in FIG. 15, is set to a time corresponding to the time point when the terminal voltage of the main discharge electrodes 118, 120 reaches the pulse charge voltage Vp. The preionization means is made up of the ultraviolet ray lamp 136, the electromagnetic shutter 138, the delay means 142 and the trigger means 134.

In the above-mentioned configuration, the relationship between the pulse charge voltage Vp across the peaking capacitor 122 and the discharge breakdown voltage $V_{B1}$ between the main discharge electrodes 118, 120 is set to satisfy $Vp \geq V_{B1}$. At the same time, the value of the inductance 126 is regulated in such a manner that the pulse charging time Tt is about 5 to 50 $\mu$s and longer than the main discharge time. In the case where the pulse signal 1100 is produced as a discharge command from the trigger means 134 with the delay time Td of the delay means 142 set to a level larger than the pulse charging time Tt, the high-voltage switch 132 closes the contacts thereof first of all. Upon closing of the contacts of the high-voltage switch 132, the charges filled in the charging capacitor 128 are moved to the peaking capacitor 122 through a resonant circuit in loop form including the capacitor 128, the high-voltage switch 132, the peaking capacitor 122 and the inductance 126, thereby gradually increasing the voltage across the peaking capacitor 122. More specifically, the terminal voltage between the main discharge electrodes 118, 120 increases gradually.

When the voltage across the peaking capacitor 122 reaches Vp at a time point Tt, the main discharge electrodes 118, 120 are impressed with a set voltage providing a dischargeable voltage. After that, when the electromagnetic shutter 138 opens in response to a pulse signal 1102 at the time point Td, the lamp light 140 of an ever constant quantity of ultraviolet ray is applied into the container 112 through the full-reflection mirror 114 as long as the electromagnetic shutter 138 is open. After a time interval of t following the application of the lamp light 140, or at a time point t of 50 ns, for example, the discharge is started between the main discharge electrodes 118, 120. Under this condition, the presence of seed electrons between the main discharge electrodes 118, 120 causes a uniform glow discharge over the whole area between the main discharge electrodes 118, 120, thereby emitting a laser beam 144 from the output mirror 116.

In this way, according to the present embodiment, since the ultraviolet ray lamp 136 like a mercury lamp is used as a preionization source, the apparatus can be reduced in size as compared with the apparatus using the X ray or laser beam as a preionization source, thus facilitating the handling thereof, even if a plurality of light-emitting lamps 136 are used. Further, the fact that a uniform glow discharge is produced makes it possible to prevent the laser gas from being deteriorated by the arc, thereby contributing to a longer service life of the apparatus.

Also, since the lamp light 140 with a fixed quantity of ultraviolet ray emission is capable of being applied into the laser gas, it is possible to start the main discharge at a time point when the accumulated amount of preionization reaches a considerable level, thereby permitting the laser beam 144 to be improved in efficiency and output. Further, in view of the fact that the rate of increment of the voltage applied between the main discharge electrodes 118, 120 need not be increased and that the trigger function is provided between the main discharge electrodes 118, 120, the burden on the high-voltage switch 132 is reduced, thereby making it possible to use a solid-state device as the high-voltage switch 132. If a solid-state device is used as the high-voltage switch 132 in place of thyratron, the apparatus is further reduced in size.

Furthermore, the lack of spark from the preionization source unlike in the prior art suppresses noises due to discharge, thereby preventing the apparatus from malfunction while at the same time stabilizing the operation of the apparatus.

Figure 16:
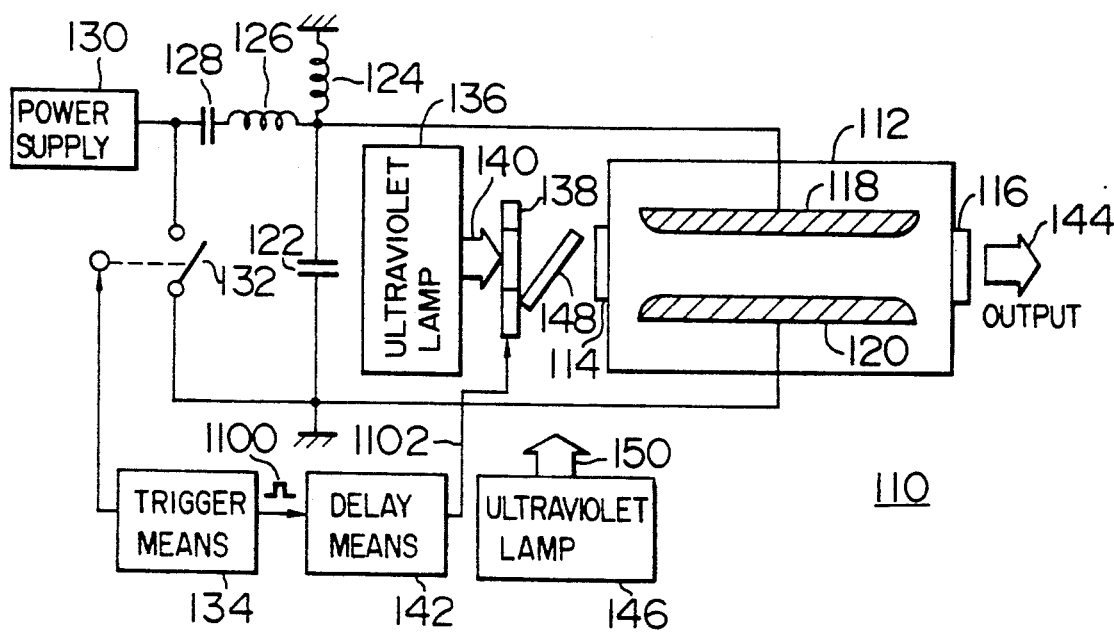
FIG. 16 is a diagram showing an eighth embodiment of the present invention.

Now, an eighth embodiment of the present invention will be explained with reference to FIGS. 16 to 17.

In this embodiment, an ultraviolet ray lamp 146 is installed as a second preionization source outside a container 112, and a beam splitter 148 is inserted between an electromagnetic shutter 138 and a full-reflection mirror 114, so that the lamp light 140 from the ultraviolet ray lamp 136 is applied through the beam splitter 148 into the container 112, while at the same time constantly irradiating the lamp light 150 from the ultraviolet ray lamp 146 into the container 112 through the beam spliter 148. The circuit constants are set in such a manner that the rate of increment of the voltage impressed across the peaking capacitor 122 is, say, 0.1 to 0.3 kV/ns. Except for the delay time $t_1$ of the delay means 142 which has been changed, the same or equivalent component parts or elements are designated by the same reference numerals and will not be described again.

Figure 17:
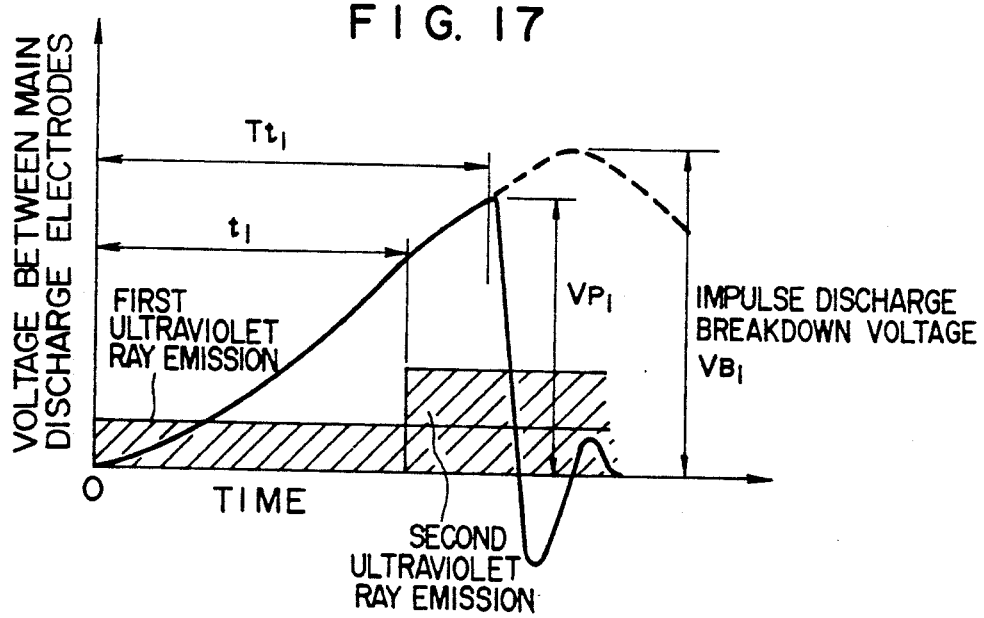
FIG. 17 is a diagram for explaining the operation of the apparatus shown in FIG. 16.

According to this embodiment, as shown in FIG. 17, the lamp light 150 from the ultraviolet ray lamp 146 is kept applied into the container 112, so that when the electromagnetic shutter 138 is opened at the time point $t_1$ after the closure of the contacts of the high-voltage switch 132 by a pulse signal 1100 from the trigger means 134, the fact that the preionization has already been completed by the lamp light 150 causes discharge at a time point $T_{t1}$ when the voltage between the main discharge electrodes 118, 120 falls to a discharge voltage $V_{p1}$ slightly below the impulse discharge breakdown voltage $V_{B1}$.

According to the present embodiment, as in the above-mentioned embodiment, the continuous application of the light from a ultraviolet ray lamp into the laser gas produces a uniform glow discharge with the same effect as in the aforementioned embodiment. Further, according to the present embodiment in which the lamp light 150 from the ultraviolet ray lamp 146 is continuously applied into the laser gas, a small amount of impurities of chlorides may be dissociated.

If the aforementioned embodiment is so configured as to progressively increase the irradiation energy of the lamp light 150 produced from the ultraviolet ray lamp 146, the amount of preionization may be increased in stages, with the result that a more sufficient preionization is made possible before starting the main discharge, thereby improving the efficiency and output power of the laser beam. It is also possible to increase the irradiation energy of the ultraviolet ray lamp 136 in stages.

Figure 18:
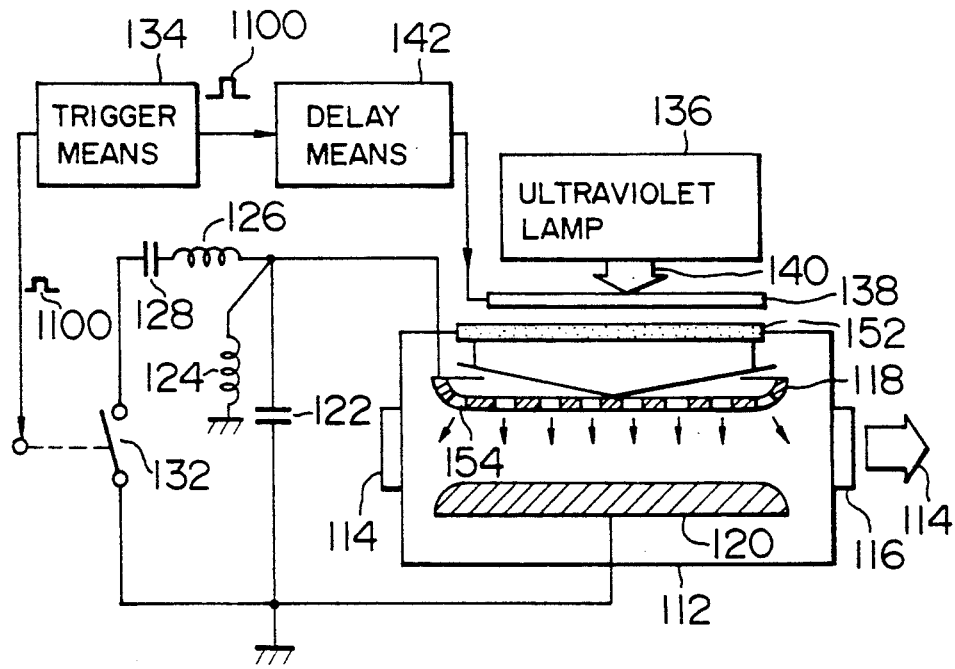
FIG. 18 is a diagram showing a ninth embodiment of the present invention.

Now a ninth embodiment of the present invention will be explained with reference to FIG. 18.

In this embodiment, a main discharge electrode 118 on high voltage side is formed in mesh structure, and a light-transmitting window 152 is formed in the side wall of the container 112 on the back of the main discharge electrode 118. An ionization shutter 138 is disposed in opposed relationship to the light-transmitting window 152. The remaining parts of the configuration are similar to those shown in FIG. 14 and therefore are designated by the same reference numerals as the corresponding parts in FIG. 14 without further explanation.

The main discharge electrode 118 according to this embodiment includes a plurality of light transmission paths over substantially the whole area of the main discharge electrode 118 for leading the incident light from the light-transmitting window 152 toward the main discharge electrode 120. More specifically, the lamp light 140 from the ultraviolet ray lamp 138 is adapted to be irradiated over substantially the whole area between the main discharge electrodes 118, 120 through the light-transmitting window 152 and each light transmission path 152. As a result, according to the present embodiment, preionization is effected uniformly over the whole area between the main discharge electrodes 118, 120, thereby realizing a more uniform glow discharge.

Figure 19:
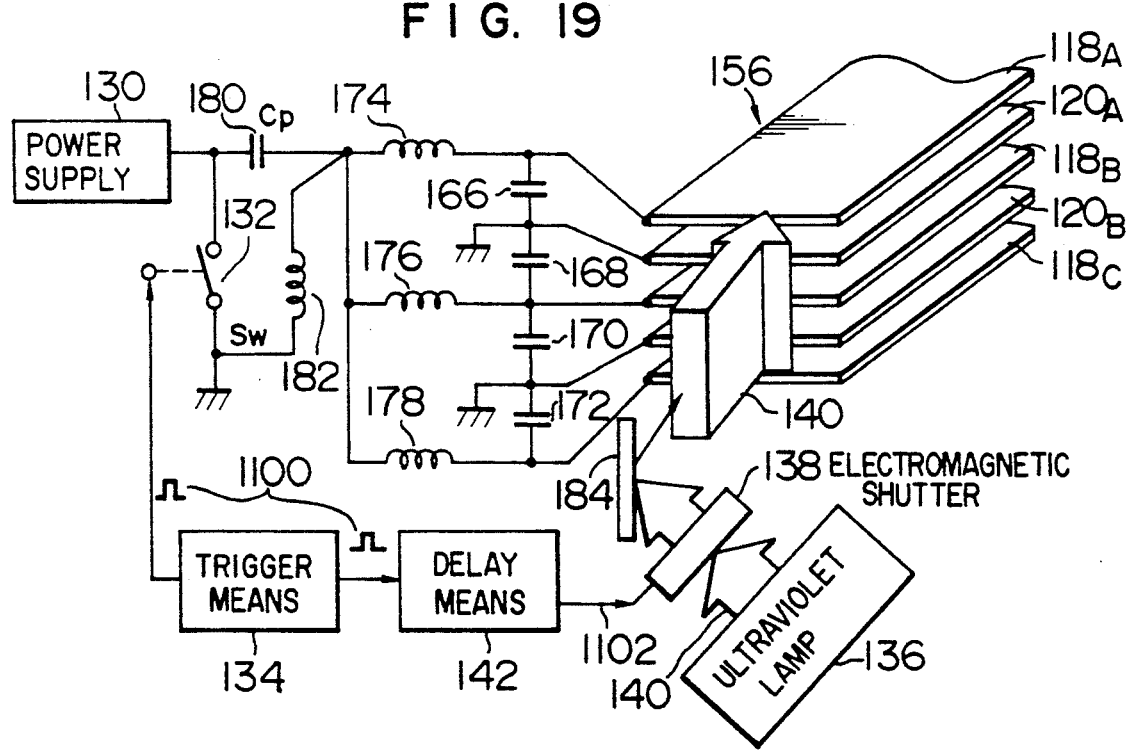
FIG. 19 is a diagram showing a tenth embodiment of the present invention.
Figure 20:
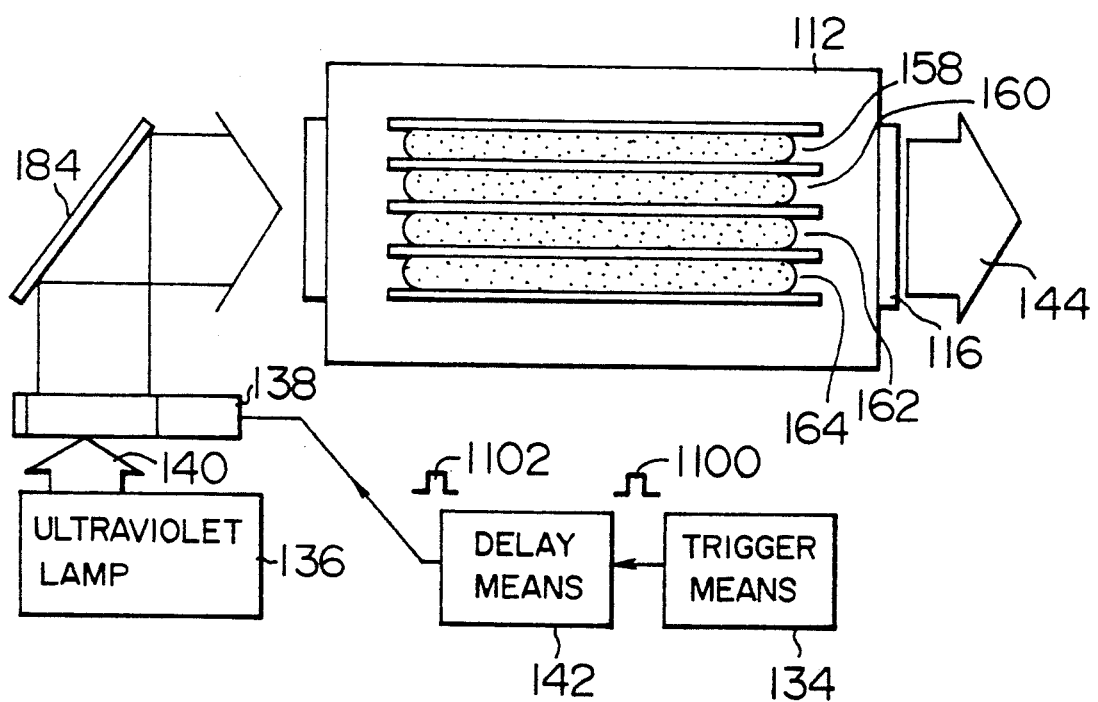
FIG. 20 is a diagram for explaining the essential parts of the apparatus shown in FIG. 19.

Now, explanation will be made about a tenth embodiment of the present invention with reference to FIGS. 19 and 20.

This embodiment comprises at least two pairs of the main discharge electrode 118 and the main discharge electrode 120 shown in FIG. 14 formed in layers to make up multi-layered main discharge electrode means 156, which is connected to electrode excitation means on the one hand, and the lamp light 140 is applied from an ultraviolet ray lamp 136 to the main discharge electrodes 156 on the other hand.

The multi-layered discharge electrodes 156 include high-voltage main discharge electrodes 118A, 118B, 118C and low-voltage discharge electrode 120A, 120B. These electrodes are arranged alternately in parallel to the laser optical axis. Small discharge means 158, 160, 162, 164 are formed in multiple layers between the electrodes. Peaking capacitors 166, 168, 170 are connected between the electrodes. The high-voltage main discharge electrodes 118A, 118B, 118C are connected through inductances 174, 176, 178 respectively to a charging capacitor 180 and a charging inductance 182. The input terminal of the capacitor 180 is connected to a power supply 130, and the output terminal of the power supply 130 to a high-voltage switch 132. Also, a reflector 184 is inserted between a full-reflection mirror 114 and an electromagnetic shutter 138, so that the lamp light 140 from the ultraviolet ray lamp 136 is applied into the container 112 in a form refracted by 90 degree at the reflector 184 through the electromagnetic shutter 138.

In the aforementioned configuration, when a pulse signal 1100 is produced from the trigger means 134, the contacts of the high-voltage switch 132 are closed, and the charges filled in the charging capacitor 180 are moved to the peaking capacitors 166, 168, 170 and 172 through a resonance circuit due to a loop including the capacitor 180, the switch 132, the peaking capacitor 166 and the inductance 174 in that order, a loop including the capacitor 180, the switch 132, the peaking capacitor 168 and the inductance 176 in that order, a loop including the capacitor 180, the switch 132, the peaking capacitor 170 and the inductance 176 in that order and a loop including the capacitor 180, the switch 132, the peaking capacitor 172 and the inductance 178 in that order, thereby gradually increasing the terminal voltage between the electrodes 118A, 118B and 120A, 120B respectively. The discharge time is set to a period sufficiently long as compared with that of the main discharge depending on the values of the inductances 174, 176, 178.

Assume that the electromagnetic shutter 138 is energized a delay time Td after the contacts of the switch 132 are closed. The lamp light 140 from the ultraviolet ray lamp 136 is applied between the electrodes of the multi-layered main discharge electrode means 156 through the reflector 184. As a result, the preionization is effected at the small discharge means 158, 160, 162, 164, thereby forming a uniform glow discharge over the whole area of the electrodes. Thus, according to this embodiment, uniform preionization is possible simultaneously at each area of the small discharge means 158, 160, 162, 164 in multi-layered structure, thereby making it possible to produce a large-diameter laser beam.

According to the present embodiment, the main electrode space is formed as a congregation of multi-layered small-gap discharge spaces, and therefore a single small gap is capable of being regulated in conformity to the applied voltage. As a consequence, the main discharge is available with a comparatively low voltage, and thus the insulation of the laser apparatus is facilitated, while at the same time reducing the size of the high-voltage power supply 130.

In the embodiment described above, the electrodes 118A to 118C and 120A, 120C may be configured in double structure or multiporous form. It is also possible to use a high dielectric material for the peaking capacitors 166, 168, 170, 172.

Also, according to the present embodiment, a large-diameter laser beam is available, and the use of such a laser beam for cutting a workpiece like an LSI improves the machining quality even with the irradiation of a single laser beam. By the way, the wavelength of the ultraviolet ray lamp 136 used in the above-mentioned embodiments is preferably longer than 500 nm, and if a wavelength shorter than the laser oscillation wavelength is used, a superior effect of preionization is achieved.

Further, unlike in the present embodiment which has the lamp light 140 irradiated from the full-reflection mirror 114, the laser beam from the output coupler (mirror) 116 may alternatively be produced through a beam splitter while at the same time applying the lamp light 140 from the ultraviolet ray lamp 136 into the container 112 through the output coupler (mirror) 116. In this case, it is sufficient to provide only the output coupler (mirror) 116 as a light-transmitting window.

In addition, the ultraviolet ray lamp 136 included in each of the above-mentioned embodiments may be so constructed as to be energized in combination with a discharge tube or thyratron, thereby saving the delay means. In such a case, the control reliability is further improved.

We claim:

1. A high pressure gas laser apparatus comprising: a hermetic container having a gas laser medium sealed therein, a plurality of main discharge electrodes arranged in the hermetic container, an excitation charging circuit connected to the main discharge electrodes for supplying energy to excite the laser gas in a discharge space by causing a discharge between the main discharge electrodes, and a preionization means for subjecting the discharge space to preionization before main discharge between the main discharge electrodes, wherein the main discharge electrodes include high-voltage electrodes and low-voltage electrodes arranged alternately to form at least two set of discharge means in layers in parallel to the laser optical axis.

2. A high pressure gas laser apparatus comprising a hermetic container having a gas laser medium sealed therein, a plurality of main discharge electrodes arranged in the hermetic container, an excitation charging circuit connected to the main discharge electrodes for supplying, energy to excite the laser gas in a discharge space by causing a discharge between the main discharge electrodes, and preionization means for subjecting the discharge space to preionization before main discharge between the main discharge electrodes, wherein the preionization means is a multiple-reflection laser beam having a time lag with the voltage application to the main discharge electrodes.

3. A high pressure gas laser apparatus according to claim 2, further comprising a plurality of reflection mirrors configured to cause the optical axis of the multiple-reflection laser beam to cross at substantially right angles to the optical axis of the laser beam formed by main discharge.

4. A high pressure gas laser apparatus according to claim 3, wherein the reflection mirrors are each provided with a coating which does not reflect the laser beam wavelength of the main laser apparatus.

5. A high pressure gas laser according to claim 2, wherein the hermetic container is partially formed of a rear mirror and said output coupler, said full-reflection mirror and said output mirror each being provided with a coating which does not reflect the wavelength of the laser beam for preionization.

6. A high pressure gas laser apparatus according to claim 1, wherein the main discharge electrodes are porous electrodes having a multiplicity of pores, the apparatus further comprising a corona electrode surrounded by dielectric material on the back of the uppermost main discharge electrode.

7. A high pressure gas laser apparatus according to claim 1, wherein each of the discharge electrodes is formed as a mesh.

8. A high pressure gas laser apparatus according to claim 1, wherein the excitation charging circuit is a pulse shaping circuit including a plurality of ceramic capacitors integrally formed with each other.

9. A high pressure gas laser apparatus according to claim 1, wherein the discharge between the main discharge electrodes causes the laser gas in the discharge space to emit a laser beam, and wherein the apparatus further comprises means for irradiating a surface of a material with the laser beam to anneal the material.

10. A high pressure gas laser apparatus comprising a hermetic container having a gas laser medium sealed therein, a plurality of main discharge electrodes arranged in the hermetic container, an excitation charging circuit connected to the main discharge electrodes for supplying energy to excite the laser gas in a discharge space by causing a discharge between the main discharge electrodes, and preionization means for subjecting the discharge space to preionization before main discharge, wherein the main discharge electrodes include high-voltage electrodes and low-voltage electrodes arranged alternately to form at least two sets of discharge means in layers in parallel to the laser optical axis, and the preionization means is a multiple-reflection laser beam having a time lag with the voltage application to the main discharge electrodes.

11. A high pressure gas laser apparatus according to claim 10, further comprising reflection mirrors arranged on the sides of the discharge means to cause the multiple-reflection laser beam for preionization to cross at substantially right angles to the optical axis of the main laser apparatus.

12. A high pressure gas laser apparatus according to claim 10, wherein each of the main discharge electrodes includes a porous electrode having a multiplicity of pores, the apparatus further comprising a corona electrode surrounded by a dielectric material on the back of the uppermost main discharge electrode.

13. A high pressure gas laser apparatus according to claim 10, wherein each of the main discharge electrodes is formed as a mesh.

14. A high pressure gas laser apparatus according to claim 10, wherein the excitation charging circuit is a pulse shaping circuit including a plurality of ceramic capacitors formed integrally with each other.

15. A high pressure gas laser apparatus according to claim 2, wherein the plurality of main discharge electrodes are arranged in the hermetic container to define a plurality of discharge spaces occupied by the laser gas.

16. A higher pressure gas laser apparatus according to claim 15, wherein the discharge between the main discharge electrodes causes the laser gas in the discharge spaces to emit a laser beam, and wherein the apparatus further comprises means for irradiating a surface of a material with the laser beam to anneal the material.

17. A high pressure gas laser apparatus comprising:
a hermetic container having a gas laser medium sealed therein;
a plurality of main discharge electrodes arranged in parallel in the hermetic container to define a plurality of parallel discharge spaces occupied by the gas laser medium, the main discharge electrodes including high-voltage electrodes alternately arranged with low-voltage electrodes, each of the discharge spaces being defined by a high-voltage electrode on one side of the discharge space and a low-voltage electrode on an opposite side of the discharge space;
an excitation charging circuit for supplying energy to the main discharge electrodes to excite the gas laser medium in the discharge spaces by producing a main discharge between the high-voltage electrodes and the low-voltage electrodes; and
preionization means for subjecting the gas laser medium in the discharge spaces to preionization before the main discharge is produced between the high-voltage electrodes and he low-voltage electrodes.

18. A high pressure gas laser apparatus according to claim 17, wherein the main discharge between the high-voltage electrodes and the low-voltage electrode causes the gas laser medium in the discharge spaces to emit a laser beam, and wherein the apparatus further comprises means for irradiating a surface of a material with the laser beam to anneal the material.

19. A method of annealing a plurality of objects comprising the steps of:
directing a laser beam generated from a high pressure gas laser apparatus according to claim 1, 10, 15, or 17 to a predetermined annealing position; and
providing continuous relative motion in a single direction between the predetermined annealing position and a plurality of objects to cause the laser beam to be sequentially applied to the plurality of objects to sequentially anneal the plurality of objects.

20. A method of annealing a plurality of objects comprising the steps of
directing a laser beam generated from a high pressure gas laser apparatus according to claim 1, 10, 15, or 17 to a predetermined annealing position; and
sequentially positioning a plurality of objects at the predetermined annealing position such that each object is entirely irradiated by the laser beam to anneal each object with a single irradiation of the laser beam.

21. A high pressure gas laser apparatus comprising a hermetic container having a gas laser medium sealed therein, a plurality of main discharge electrodes arranged in the hermetic container, an excitation charging circuit connected to the main discharge electrodes for supplying energy to excite the laser gas in a discharge space by causing a discharge between the main discharge electrodes, preionization means for subjecting the discharge space to preionization by laser beam before the main discharge between the main discharge electrodes, and means for reflecting the laser beam,
wherein the laser beam for preionization is reflected from the reflection means, and the reflected laser beam for preionization is turned around and applied into the discharge space between the main discharge electrodes thereby to subject the discharge space to preionization, followed by main discharge in the discharge space, thereby emitting a laser beam.

22. A method of annealing a material comprising the steps of:
generating a laser beam from a high pressure gas laser apparatus comprising a hermetic container having a gas laser medium sealed therein, a plurality of main discharge electrodes including a plurality of high-voltage electrodes and low-voltage electrodes arranged in opposed and spaced relationship to each other in alternate layers to form at least two sets of discharge means parallel to the laser optical axis in the hermetic container, an excitation charging circuit connected to the main discharge electrodes for supplying energy to excite the laser gas in a discharge space by causing a discharge between the main discharge electrodes, and preionization means for subjecting the discharge space to preionization before discharge between the main discharge electrodes; and
applying the laser beam generated from the high pressure gas laser apparatus to a surface of a material to anneal the material.

23. A method of annealing a material comprising the steps of:
generating a laser beam from a high pressure gas laser apparatus comprising a hermetic container having a gas laser medium sealed therein, a plurality of main discharge electrodes arranged in the hermetic container, an excitation charging circuit connected to the main discharge electrodes for supplying energy to excite the laser gas in a discharge space by causing a discharge between the main discharge electrodes, and preionization means including a multiple-reflection laser beam having a time lag with the voltage application to the main discharge electrodes for subjecting the discharge space to preionization before the main discharge between the main discharge electrodes; and
applying the laser beam generated from the high pressure gas laser apparatus to a surface of a material to anneal the material.

24. A method of annealing a material comprising the steps of:
generating a laser beam from a high pressure gas laser apparatus comprising a hermetic container having a gas laser medium sealed therein, a plurality of main discharge electrodes including a plurality of high-voltage electrodes and low-voltage electrodes arranged alternately to form at least two set of discharge means in layers parallel to the laser optical axis, an excitation charging circuit connected to the main discharge electrodes for supplying energy to excite the laser gas in a discharge space by causing a discharge between the main discharge electrodes, and preionization means including a multiple-reflection laser beam having a time lag with the voltage application to the discharge electrodes for subjecting the discharge space to preionization before the main discharge between the main discharge electrodes; and
applying the laser beam generated from the high pressure gas laser apparatus to a surface of a material to anneal the material.

25. A large-capacity laser system comprising a plurality of main laser apparatus and an external laser apparatus separate from said main laser apparatuses, wherein the main laser apparatuses are operated in parallel to each other, and the external laser apparatus is operated as a preionization source.

26. A gas laser apparatus comprising a container having at least light-transmitting window for reserving a laser medium gas, a pair of main discharge electrodes arranged in opposed relationship in the hermetic container for leading the laser beam generated by discharge to the light-transmitting window, electrode excitation means for forming a circuit connecting a power supply and the main discharge electrodes thereby to accumulate charges from the power supply and releasing the accumulated charges to each of the main discharge electrodes in response to a discharge command, and preionization means including an ultraviolet ray lamp for irradiating the ultraviolet lamp light continuously into the laser medium gas between the main discharge electrodes when the terminal voltage between the main discharge electrodes reaches a set voltage.

27. A gas laser apparatus according to claim 26 comprising a container, preionization means arranged outside the container, a pair of main discharge electrodes one of which has formed thereon a plurality of light-transmission paths over substantially the whole area of one of the main discharge electrodes for leading the incident light from at least a light-transmitting window of the container to the other electrode, and means for irradiating the lamp light from the preionization means into each of the light-transmission paths.

28. A gas laser apparatus according to claim 26 comprising multi-layered main discharge electrode means including at least two sets of a high-voltage main discharge electrode and a low-voltage main discharge electrode arranged in layers in opposed relationship to each other with a laser medium gas therebetween, electrode excitation means connected with each set of the electrodes of the multi-layered discharge electrode means, and preionization means for applying the lamp light therefrom into the laser gas medium between the electrodes of each set.

29. A gas laser apparatus according to claim 26, further comprising means for condensing part of the lamp light from the preionization means to a specific area between the main discharge electrodes.

30. A gas laser apparatus according to claim 27, wherein said container includes at least a light-transmitting window for emission of a laser beam and the one for incidence of the ultraviolet lamp light.

31. A gas laser apparatus according to claim 27, wherein the container includes at least a light-transmitting window for both emission of the laser beam and incidence of the ultraviolet lamp light, and a beam splitter arranged in the laser beam propagation path and the ultraviolet lamp light propagation path outside the container.

32. A laser processing system comprising a gas laser apparatus according to claim 26, and means for machining an object with a laser beam from the main discharge electrodes of the gas laser apparatus.

33. A gas laser apparatus comprising a container having at least a light-transmitting window for reserving a laser medium gas, a pair of main discharge electrodes arranged in opposed relationship to each other in the container for leading the laser beam caused by discharge to the light-transmitting window, electrode excitation means for forming a circuit connecting a power supply and each of the main discharge electrodes, accumulating the charges from the power supply, and releasing the accumulated charges to each of the main discharge electrodes in response to a discharge command, first preionization means including an ultraviolet ray lamp for applying the ultraviolet lamp light continuously into the laser medium gas between the main discharge electrodes when the terminal voltage between the main discharge electrodes reaches a set voltage level, and second preionization means for applying the ultraviolet lamp light continuously into the laser medium gas between the main discharge electrodes.

34. A gas laser apparatus according to claim 33, comprising a container, preionization means arranged outside the container, a pair of main discharge electrodes one of which has formed over substantially the whole area thereof a plurality of light-transmission paths for leading the incident light from the light-transmitting window of the container to the other electrode, and means for applying the lamp light from the preionization means into each of the light-transmission paths.

35. A gas laser apparatus according to claim 33, comprising multi-layered main discharge electrode means including at least two sets of a high-voltage main discharge electrode and a low-voltage main discharge electrode arranged in layers in opposed relationship to each other with a laser medium gas therebetween, electrode excitation means connected to each electrode of each set of the multi-layered main discharge electrode means, and means for applying the lamp light from the preionization means into the laser medium gas between the electrodes of each set.

36. A gas laser apparatus according to claim 33, comprising condensation means for condensing part of the lamp light from the preionization means on a specific area between the main discharge electrodes.

37. A gas laser apparatus according to claim 34, wherein the container includes a light-transmitting window for emission of the laser beam and a light-transmitting window for incidence of the ultraviolet ray lamp light.

38. A gas laser apparatus according to claim 34, wherein the container includes at least a light-transmitting windows for both the emission of the laser beam and incidence of the ultraviolet lamp light, said apparatus further comprising a beam splitter arranged in an ultraviolet ray lamp light propagation path and a laser beam propagation path outside the container.

39. A laser processing system comprising a gas laser apparatus according to claim 33, and means for cutting an object with a laser beam from the main discharge electrodes of the gas laser apparatus.

40. A gas laser apparatus comprising a container including at least a light-transmitting window for reserving a laser medium gas, a pair of main discharge electrodes arranged in opposed relationship to each other in the container for leading the laser beam generated by discharge to the light-transmitting window, electrode excitation means for forming a circuit connecting a power supply and each of the main discharge electrodes, accumulating the charges from the power supply and releasing the accumulated charges to each of the main discharge electrodes in responses to a discharge command and preionization means including an ultraviolet ray lamp for applying the lamp light therefrom continuously into the laser medium gas between the main discharge electrodes while at the same time increasing the irradiation energy of the applied light progressively.

41. A gas laser apparatus according to claim 40, comprising a container, preionization means arranged outside the container, a pair of main discharge electrodes one of which has formed over substantially the whole area thereof a plurality of light-transmitting paths for leading the incident light from a light-transmitting window of the container to the other electrode, and means for applying the lamp light from preionization means into each of the light-transmitting paths.

42. A gas laser apparatus according to claim 40, comprising multi-layered discharge electrode means including at least two sets of a high-voltage main discharge electrode and a low-voltage main discharge electrode in layers arranged in opposed relationship to each other with a laser medium gas therebetween, electrode excitation means connected with the electrodes of each set of the multi-layered main discharge electrode means, and means for applying the lamp light from preionization means into the laser medium gas between the electrodes of each set.

43. A gas laser apparatus according to claim 40, further comprising condensation means for condensing part of the lamp light from the preionization means on a specific area between the main discharge electrodes.

44. A gas laser apparatus according to claim 41, wherein the container includes a light-transmitting window for emission of the laser beam and a light-transmitting window for incidence of the ultraviolet lamp light.

45. A gas laser apparatus according to claim 41, wherein the container includes at least a light-transmitting window serving both for emission of the laser beam and incidence of the ultraviolet lamp light, the apparatus further comprising a beam splitter arranged in a laser beam propagation path and an ultraviolet lamp light path outside the container.

46. A laser processing system comprising a gas laser apparatus according to claim 40, and means for cutting an object with a laser beam from the main discharge electrodes of the gas laser apparatus.

47. A high pressure gas laser apparatus comprising:
a hermetic container having a gas laser medium sealed therein;
at least two main discharge electrodes arranged in the hermetic container to define at least one discharge space occupied by the gas laser medium;
an excitation charging circuit for supplying energy to the main discharge electrodes to excite the gas laser medium in the at least one discharge space by producing a main discharge between the main discharge electrodes, thereby causing the gas laser medium in the at least one discharge space to emit a main laser beam;
preionization means for generating a preionization laser beam for subjecting the gas laser medium in the at least one discharge space to preionization before the main discharge is produced between the main discharge electrodes; and
reflection means for reflecting the preionization laser beam through the at least one discharge space at least one time before the main discharge is produced between the main discharge electrodes.

48. A high pressure gas laser apparatus according to claim 47, wherein the at least two main discharge electrodes include a plurality of main discharge electrodes arranged in parallel in the hermetic container to define a plurality of parallel discharge space occupied by the gas laser medium, and wherein the main laser beam is emitted from the gas laser medium in the discharge spaces along an axis which is parallel to the main discharge electrodes.

49. A high pressure gas laser apparatus according to claim 47, wherein the preionization means generates the preionization laser beam after a predetermined time has elapsed from a time when the excitation charging circuit begins a process of supplying energy to the main discharge electrodes, and wherein the reflection means reflects the preionization laser beam through the at least one discharge space a plurality of times before the main discharge is produced between the main discharge electrodes.

50. A high pressure gas laser apparatus according to claim 47, further comprising means for sequentially irradiating a plurality of objects with the main laser beam to sequentially anneal the objects.

* * * * *